Patented Aug. 10, 1937

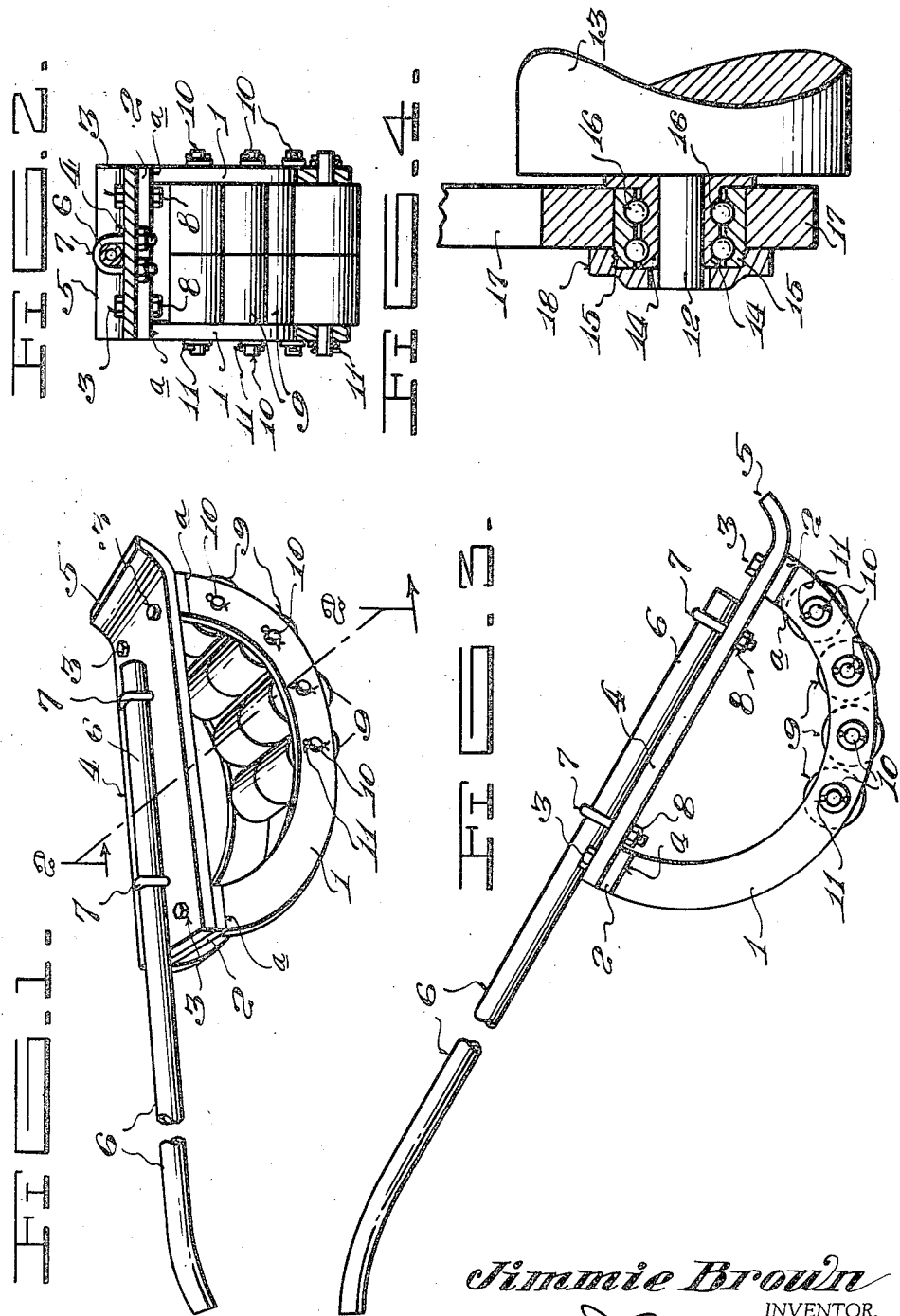

2,089,336

UNITED STATES PATENT OFFICE 2,089,336

LIFTING JACK

Jimmie Brown, Dallas, Tex.

Application June 9, 1936, Serial No. 84,258

1 Claim. (Cl. 280—49)

This invention relates to lifting jacks and it has particular reference to a device of this character designed to aid in the moving or loading of heavy and unwieldy objects.

The principal object of the invention is to provide a device for moving heavy objects by which maximum leverage on the object is assured with but a minimum amount of friction on the abutment surface. The invention provides a rocker support having the form of a segment of a circle whereby to uniformly distribute the strain when an object or a portion thereof is being raised. Moreover, the rocker support is provided with axially spaced rollers which progressively engage the floor or other abutment as the load is elevated and which feature is effective in reducing the frictional and therefore added resistance to the lifting power required to raise the load and likewise affords a means by which the load may be manually transported from place to place on the jack as a dolly.

With the foregoing objects as paramount, the invention has certain salient features of construction and operation, to become manifest as the description proceeds, taken in connection with the accompanying drawing, wherein:

Figure 1 is a perspective view of a lifting jack, constructed according to the present invention.

Figure 2 is a vertical section on lines 2—2 of Figure 1.

Figure 3 is a side elevation, and

Figure 4 is an enlarged, fragmentary view, partly in section, showing a modified form of roller bearing.

Continuing with a more detailed description of the drawing, 1 designates a pair of semi-circular rockers which comprise the support for the jack. These rockers are spaced apart as shown, and to the ends of each are secured straps 2, preferably by welding at $a$. Thus, the rockers 1 are held operatively together.

Secured by bolts 3 to the straps 2 is a plate 4, having an upturned end or lip 5, the better to underreach an object to be elevated or moved.

A handle, preferably comprised of a length of pipe 6 is secured to the plate 4 by means of U-bolts 7, the latter being affixed by nuts 8 beneath the plate 4.

It is apparent from the foregoing that by setting the lip 5, under the object to be raised, the circular or arcuate rockers 1 afford a constant and increasing leverage when downward pressure is applied to the handle 6, without the attendant friction present in a support not provided with rollers such as those rotatably disposed between the rockers 1 and identified by the numeral 9.

The rollers 9 are mounted two on a shaft 10 so that any shift of weight from one side to the other on the jack be borne separately by a roller 10 to minimize the effort required to move the jack. Ordinarily the shafts 10 are journaled in apertures in each of the rockers 1 and are held against longitudinal displacement by means of a cotter key 11.

Should it be desired to reduce the friction of the roller axles, a ball bearing assembly, such as shown in Figure 4 may be provided. This assembly is comprised of the shaft 12, carrying the roller or rollers 13, surrounding which is an inner ball race 14. An outer race 15 retains the balls 16 and is suitably secured in an aperture in the rocker 17 of the jack. A nut 18 holds the bearing assembly against displacement from the rocker support.

Manifestly, the construction shown and described is capable of considerable modification and such modification as may be considered within the scope and meaning of the appended claim is also considered within the spirit and intent of the invention.

What is claimed is:

In a lifting jack, the combination comprising a pair of parallel, semi-circular rocker supports having a rectangular plate secured to their ends to provide a platform, said plate having its forward end curved upward, a series of rollers disposed in axially parallel relationship between said rocker supports and having pivotal pins, ball bearings arranged in apertures in said rocker supports receiving said pins, a handle for said jack comprising a rod partially overlying said platform plate longitudinally, inverted U-bolts penetrating said plate and embracing said rod at points spaced from either end of said plate and means retaining said U-bolts, capable of being released, to effect adjustment in the effective length of the handle portion of said rod.

JIMMIE BROWN.